United States Patent [19]

Basiulis

[11] 4,106,171

[45] Aug. 15, 1978

[54] METHOD FOR CLOSURE OF HEAT PIPES AND DEVICE FABRICATED THEREBY

[75] Inventor: Algerd Basiulis, Redondo Beach, Calif.

[73] Assignee: Hughes Aircraft Company, Culver City, Calif.

[21] Appl. No.: 528,173

[22] Filed: Nov. 29, 1974

[51] Int. Cl.² .............................................. B23P 15/26
[52] U.S. Cl. ............................... 29/157.3 R; 165/105; 53/83; 219/72
[58] Field of Search .................. 29/157.3 R, DIG. 34; 165/105; 228/126, 131, 232; 219/72, 94, 17, 96, 81; 53/83

[56] References Cited

U.S. PATENT DOCUMENTS

| | | | |
|---|---|---|---|
| 1,790,787 | 2/1931 | Badger | 53/83 |
| 3,426,170 | 2/1969 | Miller | 219/74 |
| 3,428,773 | 2/1969 | Basiulis | 219/72 |
| 3,456,416 | 7/1969 | Coe | 53/83 |
| 3,587,725 | 6/1971 | Basiulis | 165/105 |
| 3,672,020 | 6/1972 | Freggens | 165/105 |
| 3,769,674 | 11/1973 | Droughton et al. | 29/157.3 R |
| 3,797,086 | 3/1974 | Asselman | 29/157.3 R |

*Primary Examiner*—C.W. Lanham
*Assistant Examiner*—Daniel C. Crane
*Attorney, Agent, or Firm*—Lewis B. Sternfels; W. H. MacAllister

[57] ABSTRACT

A plunger placed through an opening in a heat pipe enclosure is heated to a temperature above the saturation temperature of the working fluid in the heat pipe to prevent the fluid from condensing across the gap between the plunger and the opening and to allow noncondensible gases to escape. Thereafter, the plunger is melted to seal the heat pipe. The plunger and at least that part of the heat pipe with the opening therethrough are made from the same materials.

10 Claims, 5 Drawing Figures

METHOD FOR CLOSURE OF HEAT PIPES AND DEVICE FABRICATED THEREBY

BACKGROUND OF THE INVENTION

1. Field of the Invention

The present invention relates to heat pipes and, in particular, for closure thereof.

2. Description of the Prior Art

At some point in the fabrication of heat pipes the working fluid must be placed and sealed in the heat pipe enclosure. Several conventional sealing techniques which are currently employed include cold and hot pinch-off welding, RF braising, soldering, dissimilar material fusion, and a combination of one or more of these. While all of these techniques work well, they require that the sealing operation and the operator be at the heat pipe itself. In some cases, such a procedure may be hazardous to the operator or may cause not altogether successful sealing of the heat pipe. For example, the working fluid may comprise a toxic or potentially hazardous material, e.g., liquid metal. Secondly, some of the working fluid may remain at the closure point, thereby deleteriously affecting sealing, leading to a present or potential failure in operation.

SUMMARY OF THE INVENTION

The present invention overcomes these and other problems by sealing an opening, through which the working fluid had been placed into the heat pipe, with a plug, which is made of the same material as the material surrounding the opening. The plug is heated to a temperature above the saturation temperature of the working fluid to drive the fluid away from the opening and thereby to prevent the fluid from condensing at the opening, as well as to allow non-condensible gases to escape therefrom. Thereafter, the plug is melted into and fused with the opening to seal the heat pipe. Preferably, the heating and melting operation is accomplished by passing electrical current through the plug from a high current power supply. As a result, the closure operation need not be controlled at the heat pipe and the sealing environment may be selected for the most beneficial sealing results.

It is, therefore, an object of the present invention to provide for remote controlled sealing of heat pipes.

Another object is to provide for high reliability heat pipe closure.

Other aims and objects as well as a more complete understanding of the present invention will appear from the following explaination of exemplary embodiments and the accompanying drawings thereof.

DESCRIPTION OF THE PREFERRED EMBODIMENTS

Figure 1:
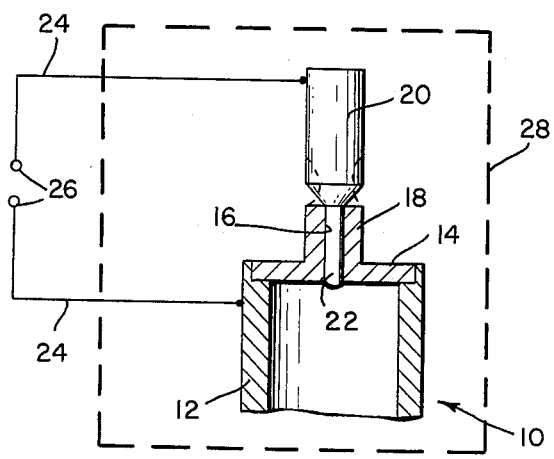
FIG. 1 depicts a first embodiment of the invention for processing thereof in a vacuum or inert or reducing gas environment.
Figure 2:
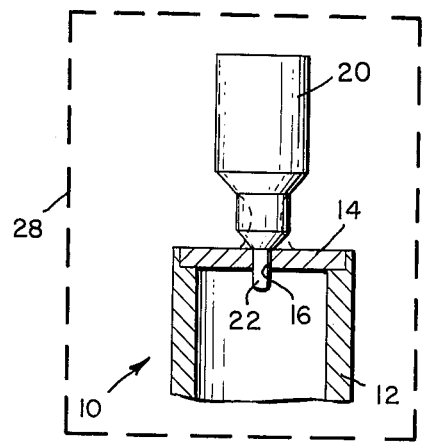
FIG. 2 is another embodiment of the invention depicting a variation of that shown in FIG. 1.

Accordingly, with reference to FIGS. 1 and 2, a heat pipe 10 includes an enclosure 12 having thereon a female end cap 14 through which an opening 16 is provided. Opening 16 is used for placement of a working fluid within enclosure 12. End cap 14 may take several configurations as either having an upstanding or protruding end 18 as shown in FIG. 1 or simply a flat section as shown in FIG. 2. Regardless of the particular configuration, a plug 20 with a plunger 22 is used to seal opening 16. In this configuration, plunger 22 is inserted within opening 16. When the end cap is provided with an extension 18, plunger 22 need not extend particularly far within enclosure 12. However, in the configuration of FIG. 2, it is preferable that plunger 22 extend somewhat into the enclosure so as to insure proper sealing.

In the operation of the invention, the plug and its plunger are heated, preferably by electrical resistance and, for this purpose, a pair of wires or leads 24 are electrically coupled to plug 20 and enclosure 12 and are connected to a high current AC or DC power supply as noted by indicium 26.

The entire apparatus, with the exception of high current power supply 26 is placed in an enclosure, as schematically depicted by dashed lines 28, for evacuation at a minimum pressure of $10^{-4}$ Torr or for establishment therein of an inert or reducing gas environment.

Figure 3:
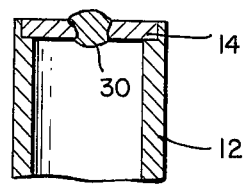
FIG. 3 depicts the end result after having utilized the present invention.

By passing electrical current through plug 20 and enclosure 12, both parts, particularly at opening 16 and plunger 22, can be heated up to the melting temperature of the materials, to make the closure when the plunger melts and fuses with the end cap. For example, the resulting closure from the FIG. 2 embodiment is illustrated in FIG. 3, in which plunger 22 and opening 16 form a melt zone 30.

In this operation, especially for liquid metal heat pipes, by passing current through plunger 22, the plunger was heated to a temperature above the saturation temperature of the working fluid within enclosure 12. This heat evaporates any working fluid from the area of end cap 14 and, in particular, from the gap between opening 16 and plunger 22, thereby preventing any of the working fluid from condensing across this gap and further allowing non-condensible gases to escape. Thereafter, the plunger is melted in the heat pipe to effect the sealing.

As stated above, the operation utilizing the embodiments shown in FIGS. 1 and 2 may be performed in vacuum preferably at a pressure of $10^{-4}$ Torr. or better; but it can also be accomplished in an inert gas or reducing gas or other environment at atmospheric pressure.

Figure 4:
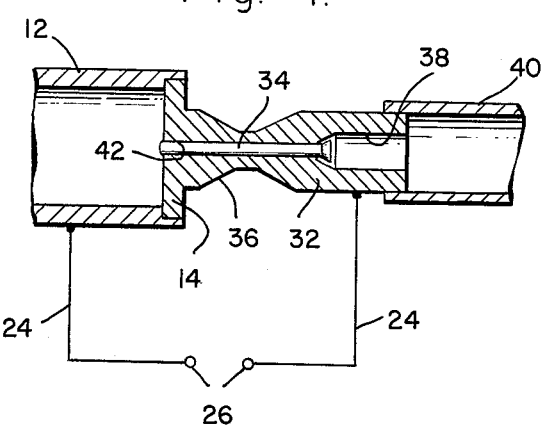
FIG. 4 depicts the further modification of the present invention wherein a totally closed environment is not required.
Figure 5:
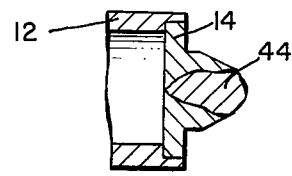
FIG. 5 depicts the results of processing from the embodiment shown in FIG. 4.

Alternately, as shown in FIG. 4, the closure may be made by utilizing a separable plug 32 and plunger 34. In this embodiment, plug 32 is tapered at 36 to facilitate the eventual melting operation. At the end of plug 32 is a recess 38 with a tube 40 secured to the exterior of plug 32 so that a minimum vacuum of $10^{-4}$ Torr., reducing gas or inert gas or the like may be utilized. Again, electrical current passing through leads 24 causes the working fluid to evaporate from plunger 34 and an opening 42 within plug 32 to drive the working fluid away and thereafter to melt the plunger at end cap 14 to form a melt zone 44, as shown in FIG. 5.

As stated above, it is preferred that the plunger and the end cap be made from the same materials. These materials may comprise any which are suitable for heat pipes, typical materials being stainless steel, copper, molybdenum and aluminum. For stainless steel, temperatures from 700° C to 900° C have been used to drive away the working fluid while melting occurs at 1,450° C. For copper, evaporation of working fluid was effected at 700° to 800° C with melting of the copper at 1,082° C. For molybdenum, evaporating temperatures of 1,660° to 1,700° C and melting temperatures of 2,620° C can be utilized. For aluminum, the evaporating temperatures of 400° to 500° C and melting temperatures of 637° C have been utilized.

Although the invention has been described with reference to particular embodiments thereof, it should be realized that various changes and modifications may be made therein without departing from the spirit and scope of the invention.

What is claimed is:

1. A method for closure of a heat pipe having a liquid metal working fluid therein comprising the steps of:
    assembling means for defining the heat pipe and enclosure therefor, with the working fluid therein and with means for defining an opening in the heat pipe enclosure for having enabled placement of the working fluid therein;
    inserting a plunger comprising the same material as that of the heat pipe enclosure into the opening means;
    before or after said assembling and inserting steps, establishing an environment in the heat pipe and enclosure means in an atmosphere which is non-reactive with the liquid metal working fluid for assuring purity thereof;
    heating the plunger and the heat pipe enclosure adjacent thereto to a temperature above the saturation temperature of the working fluid but below the melting point of the material of the heat pipe and the plunger while maintaining the environment for a time sufficient for evaporating any of the working fluid from means for defining a gap between the plunger and the opening means, for preventing the working fluid from condensing across the gap means, and for allowing escape of any non-condensible gases therefrom; and
    thereafter melting at least the plunger into the opening means while maintaining the environment for sealing the heat pipe enclosure and the working fluid therein.

2. A method as in claim 1 wherein the material of the plunger and the heat pipe enclosure each comprises stainless steel, copper, molybdenum or aluminum.

3. A method as in claim 1 wherein the material of the plunger and the heat pipe enclosure comprises stainless steel and wherein said heating step is within a temperature range of 700° to 900° C and said melting step is at a temperature of approximately 1,450° C.

4. A method as in claim 1 wherein the material of the plunger and the heat pipe enclosure comprises copper and wherein said heating step is within a temperature range of 700° to 800° C and said melting step is at a temperature of approximately 1,082° C.

5. A method as in claim 1 wherein the material of the plunger and the heat pipe enclosure comprises molybdenum and wherein said heating step is within a temperature range of 1,660° to 1,700° C and said melting step is at a temperature of approximately 2,620° C.

6. A method as in claim 1 wherein the material of the plunger and the heat pipe enclosure comprises aluminum and wherein said heating step is within a temperature range of 400° to 500° C and said melting step is at a temperature of approximately 637° C.

7. A method as in claim 1 wherein said inserting, heating, and melting steps are conducted in an evacuated atmosphere of at least approximately $10^{-4}$ Torr.

8. A method as in claim 1 wherein said heating and melting steps comprise the step of electro-resistance heating the plunger and the heat pipe enclosure adjacent thereto by the same electro-resistance equipment operating at different temperatures.

9. A method as in claim 1 wherein said inserting, heating, and melting steps are conducted in an atmosphere of inert gas or reducing gas at atmospheric pressure.

10. A method for closure of a heat pipe having a liquid metal working fluid therein at means for defining an opening in the heat pipe comprising the steps of:
    inserting a plug, comprising the same material as that defining the opening means, into the opening means;
    before or after said inserting step, establishing an environment in the heat pipe and over the working fluid which is non-reactable with the liquid metal for assuring purity thereof;
    heating the opening means at a first temperature below the melting point of the material of the opening means and the plug sufficient for evaporating any of the working fluid from and adjacent the opening means and thereby for maintaining the opening means and plug free from the working fluid while maintaining the environment; and
    thereafter further heating the opening means and the plug at a temperature higher than the first temperature while maintaining the environment for maintaining the opening means and the plug free from any of the working fluid and any other volatile materials, for fusing the material of the plug and the opening means together, and thereby for closing and sealing the opening means.

* * * * *